(12) United States Patent
Hollenbeck et al.

(10) Patent No.: US 6,902,223 B2
(45) Date of Patent: Jun. 7, 2005

(54) FOLDABLE CONVERTIBLE VEHICLE TOPS

(75) Inventors: Sven Hollenbeck, Westerkappein (DE); Joachim Maass, Bissendorf (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 11 days.

(21) Appl. No.: 10/620,171

(22) Filed: Jul. 15, 2003

(65) Prior Publication Data

US 2004/0012222 A1 Jan. 22, 2004

(30) Foreign Application Priority Data

Jul. 17, 2002 (DE) .................................. 202 10 763 U
Jul. 17, 2002 (DE) .................................... 202 10 763

(51) Int. Cl.[7] .................................................. B60J 7/12
(52) U.S. Cl. ................................. 296/107.09; 296/117
(58) Field of Search .............................. 296/117, 112, 296/115, 107.09

(56) References Cited

U.S. PATENT DOCUMENTS

| 4,720,133 | A | * | 1/1988 | Alexander et al. | ........... 296/117 |
| 5,251,952 | A | | 10/1993 | Guckel et al. | |
| 6,270,143 | B1 | | 8/2001 | Heselhaus et al. | |
| 6,325,446 | B1 | | 12/2001 | Wuellrich et al. | |

FOREIGN PATENT DOCUMENTS

| DE | 643 515 | 3/1937 |
| DE | 41 21 226 C1 | 5/1992 |
| DE | 41 02 119 C1 | 7/1992 |
| DE | 297 13 522 A1 | 12/1997 |
| DE | 197 32 672 | 2/1999 |
| DE | 198 20 711 A1 | 11/1999 |
| DE | 299 01 589 U1 | 6/2000 |
| DE | 199 36 099 | 2/2001 |
| EP | 1 024 042 B1 | 5/2003 |
| FR | 2 695 081 | 3/1994 |

* cited by examiner

*Primary Examiner*—Joseph D. Pape
(74) *Attorney, Agent, or Firm*—Michael Best & Friedrich LLP

(57) ABSTRACT

Apparatus suitable for use in convertible vehicles may include a convertible top comprising a substantially rigid front portion that moves downwardly towards and releaseably engages a windshield frame of the vehicle in order to close the convertible vehicle. At least one dampening device may be disposed at a rear portion of the convertible top and may be operably coupled to the front portion in order to slow downward movement of the front portion during a final phase of a convertible top closing operation. Further, the dampening device may be operably coupled between two pivotably connected linkages provided within the rear portion of the convertible top. The two pivotably connected linkages are preferably arranged and constructed so that the opening distance between the two linkages increases when the front portion is moving downwardly towards the windshield frame.

20 Claims, 6 Drawing Sheets

FOLDABLE CONVERTIBLE VEHICLE TOPS

CROSS-REFERENCE

Priority is claimed to German utility model application no. 202 10 763.9, filed Jul. 17, 2002, the contents of which are hereby incorporated herein in their entirety.

TECHNICAL FIELD

The present invention relates to foldable convertible tops (roof assemblies or bonnets) suitable for use with convertible vehicles and methods of making and using the same, and more particularly to foldable convertible tops including dampening devices for slowing a downwardly directed component of movement of the front portion of the convertible top towards a windshield frame when the convertible top is in the final phase of being closed.

DESCRIPTION OF THE RELATED ART

German Laid-open Patent Publication No. 198 20 711 discloses a shock absorber for dampening or restraining the forward (closing) movement of a front support hoop disposed within a folding roof assembly for a convertible vehicle. The front support hoop is connected to an intermediate support hoop via a traction cable and the shock absorber. When the roof assembly is closed, the traction cable extends substantially in parallel with a plane defined by a roof covering disposed on the roof assembly. The shock absorber utilizes a compression spring to provide a biasing or tension force and the shock absorber is connected to a front portion of the roof assembly.

When this known roof assembly is closed, the front portion of the roof, which is supported by the front support hoop, and a rearward disposed part of the roof will define a highly obtuse angle. Therefore, when the front roof portion is moving in the vicinity near the windshield frame of the vehicle (i.e., the final portion of the roof closing operation), the stroke travel length of the shock absorber (compression spring) is quite short. As a result, the compression spring must be designed to provide a very large biasing force over a short stretching distance in order to prevent the front roof portion from slamming against the windshield frame at the end of the roof closing movement. In order words, because the compression spring will have a relatively small expansion distance during its operative portion of the roof closing operation, the compression spring must have a rather inelastic construction. However, such a high biasing force will place a large stress on the linearly-extended traction cable. Furthermore, the tension cable will cut into the covering fabric disposed across the front and intermediate portions of the roof assembly due to the arrangement of the tension cable and the high tension applied to the tension cable during the final phase of the roof closing operation.

In addition, headroom above the front vehicle seats will be reduced by utilizing a shock absorber according to this known design, especially if one shock absorber is disposed on each respective side of the vehicle. Further, in order to move the relatively heavy front portion, an additional force must be applied to the roof assembly so as to move the additional weight provided by the shock absorber.

SUMMARY OF THE INVENTION

It is, therefore, one object of the present invention to provide improved foldable convertible tops (also known in the art as "roof assemblies" and "bonnets") suitable for use in convertible vehicles, and methods for making and using the same. In particularly preferred aspects of the present teachings, the convertible vehicle tops may be optimized so as to provide appropriate dampening of front portion movement when the top is being closed.

Thus, in one aspect of the present teachings, at least one dampening device is provided within the convertible top in order to restrain or provide mechanical resistance to a downwardly directed component of the movement of the convertible top during the final phase of a top closing operation. In other words, the dampening device, which optionally may comprise a shock absorber, will slow downwardly directed movement of a leading edge portion of the convertible top as the leading edge portion moves towards a vehicle windshield frame. As a result, the front portion of the convertible top will not abruptly contact (i.e., slam against) the windshield frame when the convertible top is closed.

The dampening device is preferably disposed within a rear portion of the convertible top. The rear portion of the convertible top is defined as the portion of the convertible top that will be disposed closest to the rear or back trunk portion of the vehicle. Furthermore, the dampening device preferably couples two linkages provided within the convertible top. As a result, mechanical resistance may be generated in the rear portion of the convertible top and then transmitted to the front portion of the roof assembly, e.g., via at least one of the linkages.

In another aspect of the present teachings, the space or distance between the two linkages preferably increases when the front portion of the convertible top moves towards the windshield frame during the closing operation of the convertible top. Preferably, the mechanical resistance is applied to slow down the opening speed of this distance during the final phase of the convertible top closing operation.

By placing the dampening device at or within the rear portion of the convertible top, it not necessary to put such a space-consuming device within the front portion of the convertible top. Consequently, foldable convertible tops according to the present teachings do not limit or restrict the amount of headroom above the driver's and passenger's seats of the vehicle. Furthermore, the weight of the front portion of the convertible top may be reduced, as compared to the above-noted known art, thereby further helping to reduce the speed at which the front portion of the convertible top will move towards the windshield frame during the final phase of the convertible top closing operation for convertible tops having a top dead center point defined between the fully open position and the fully closed position.

In one representative advantageous application of the present teachings, the dampening device may be operably coupled between a dead center point linkage and a rear tensioning bow within the convertible top. In this case, movement of dead center point linkage relative to the rear tensioning bow can be suitably restrained. As a result, it is possible to prevent sudden movement of the dead center point linkage beyond the top dead center point, which sudden movement is due to the effect of gravity on the front portion of the convertible top after passing the top dead center point. Thus, this feature of the present teachings further prevents the front portion of the convertible top from slamming against the windshield frame when the convertible top is closed. However, it is explicitly noted that the present teachings are also applicable to convertible tops that do not have a top dead center point defined between the fully open position and the fully closed position.

In another aspect of the present teachings, the dampening device may be disposed within a portion of the convertible top that is lateral to a space where a driver or passenger will sit within the vehicle. In this case, as noted above, the dampening device will not limit or restrict head room within the vehicle.

In another aspect of the present teachings, the dampening device may comprise a shock absorber filled with oil. Further, the oil-filled shock absorber preferably may be disposed in parallel with, and fixedly coupled to, a portion of the rear tensioning bow. In addition, one portion of the dead center point linkage may be pivotably coupled to the tensioning bow, such that the connected portion of the dead center point linkage is disposed substantially in parallel with the tensioning bow when the convertible top is folded and stowed in a vehicle open position. Thus, when the convertible top is closed, the angle defined between the tensioning bow and the pivotably coupled portion of the dead center point linkage will increase. The dampening device preferably provides mechanical resistance to reduce the opening speed of this angle during the final phase of the convertible top closing operation.

The shock absorber may preferably include an extendable and retractable piston. The shock absorber may either provide resistance only when extending or when both extending and retracting. In either case, a first end of a traction member, such as a resiliently elastic cable, may be coupled to the piston of the shock absorber and extend through a direction-changing element, such as, but not limited to, a loop, an eyelet or a hook. A second end of the traction member may be coupled to the portion of the dead center point linkage that forms an increasing angle with the tensioning bow as the convertible top is unfolded towards the vehicle closed position. In this representative case, the shock absorbing effect (mechanical resistance) can be transmitted or transferred to the dead center point linkage via the direction-changing element in a direction substantially perpendicular to the shock absorber for at least a portion of the closing movement of the vehicle top. Because the dead center point linkage is operably coupled to the front portion of the convertible top, the shock absorbing effect (mechanical resistance) can be effectively applied to the dead center point linkage, thereby restraining or slowing the downward portion of the movement of the front portion of the convertible top.

Additional objects, features and advantages of the present teachings will be readily understood to a person of ordinary skill in the art after reading the following detailed description of examples and embodiments of the present teachings together with the claims and the accompanying drawings.

DETAILED DESCRIPTION OF THE INVENTION

Figure 1:
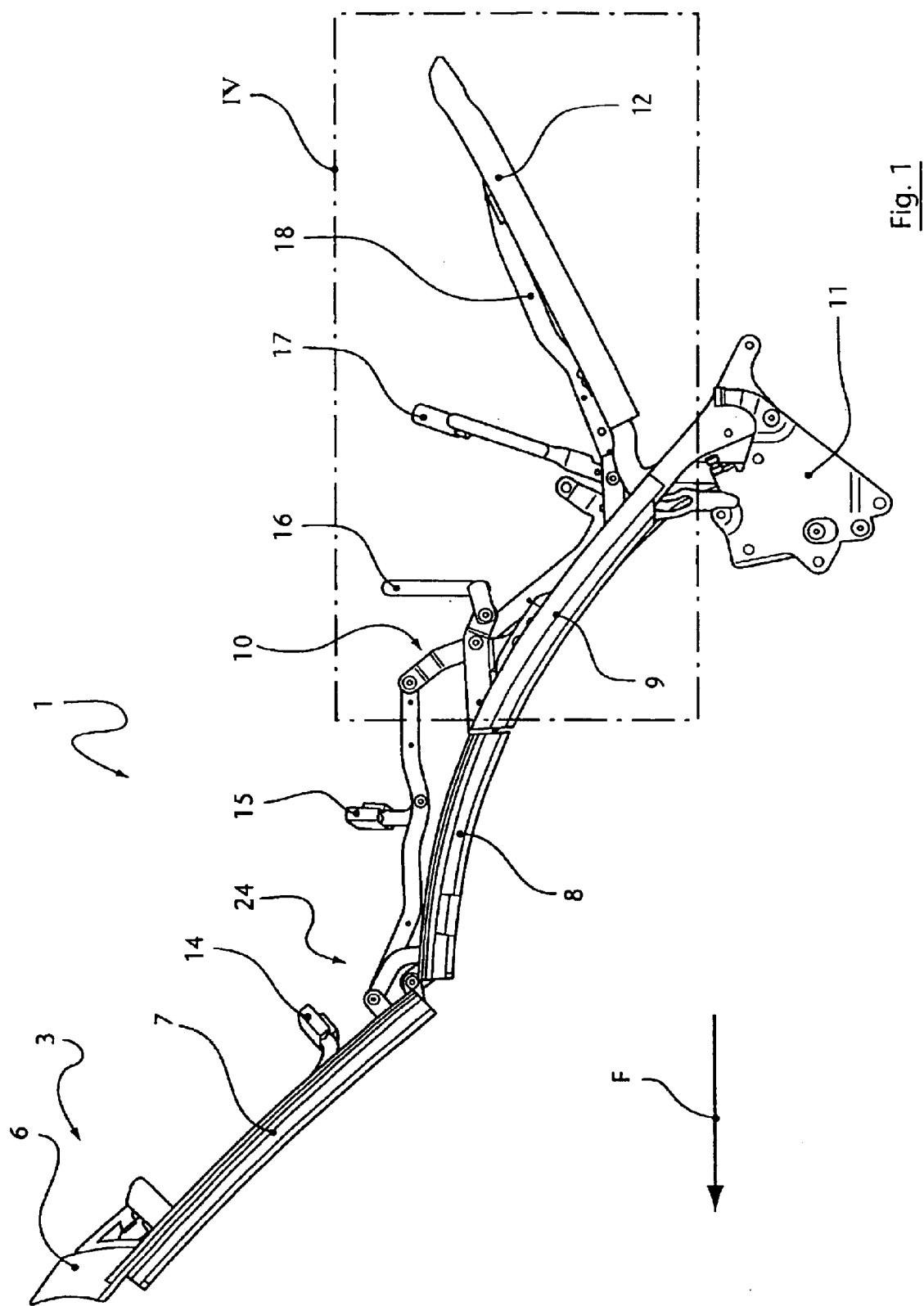
FIG. 1 is a schematic side view of linkage parts within a representative foldable convertible top according to the present teachings, in which a front portion of the convertible top is shown in a raised position.

In one embodiment of the present teachings, apparatus suitable for use in convertible vehicles may include a foldable convertible top (roof assembly) having a substantially rigid front portion. The convertible top is preferably constructed such that the front portion will move at least partially downward during a final phase of a convertible top closing operation in order to engage a windshield frame of the vehicle when the convertible top has completely unfolded to a convertible top closed position (also referred to as a "vehicle closed position"). Preferably, the mechanical resistance generated by at least one dampening device is operably coupled to the front portion so as to slow the downward component of the movement of the front portion of the top. The dampening device is preferably disposed within a rear portion of the convertible top.

As a non-limiting example, such mechanical resistance may advantageously be applied between a top dead center point (intermediate position) of the convertible top and the convertible top closed position. In another non-limiting example, the dampening device may preferably be operably coupled between two pivotably coupled components (or linkages) provided within the convertible top. The two pivotably coupled components may be disposed such that a distance between the respective non-coupled ends of the two pivotably coupled components increases when the front portion moves (at least partially downward) towards the windshield frame during the final phase of the top closing operation.

In another embodiment of the present teachings, the two pivotably coupled components may include a tensioning bow disposed in a rear portion of the convertible top and a dead center point linkage disposed in an intermediate portion of the convertible top. The tensioning bow is preferably pivotably connected to a rear portion of the dead center point linkage. The convertible top optionally may also include a plurality of lateral (transversely disposed) frame portions. The dead center point linkage may be disposed along a longitudinal direction of the lateral frame portions and a front portion of the dead center point linkage may be operably coupled to the front portion of the convertible top.

The front portion may preferably include a substantially rigid structural member (e.g., a transverse beam) arranged and constructed to laterally (transversely) extend between the windshield frame and the dead center point linkage. The front portion preferably contacts the windshield frame when the convertible top is disposed in the closed position. A fabric material may cover the rigid structural member.

In another embodiment, the dampening device preferably provides mechanical resistance only when subjected to traction loading. The dampening device may preferably comprise an oil-filled shock absorber having a piston coupled to a return spring. In such an embodiment, the oil-filled shock absorber may be disposed in parallel with a longitudinally-extending, side portion of the tensioning bow. Herein, longitudinally-extending is intended to mean in the front-to-back direction of the convertible top and vehicle to which is arranged and constructed to be attached. Similarly, laterally- or transversely-extending is intended to mean the side-to-side direction of the convertible top and vehicle to which is arranged and constructed to be attached. Further, a first end of a traction member may be coupled to the piston and a second end of the traction member may be coupled to the rear portion of the dead center point linkage.

In a particularly preferred embodiment, the traction member may extend through a direction-changing element, e.g., a loop, an eyelet, a hook, etc., in a manner that changes the extending direction of at least a portion of the traction member. For example, the direction-changing loop may preferably change the direction of the traction member by about 90°. A skilled person will recognize that a variety of designs may be utilized to change the direction of the traction member and the present teachings are not particularly limited to the representative direction-changing loop shown in the following preferred embodiment. For example, an enclosed loop structure is not required and the direction changing element may be an open structure as long is the direction changing element performs the function of changing the direction of at least a portion of the traction member.

The dampening device may preferably be configured so as to provide a piston stroke length of at least 35 mm during the roof closing operation. Such a design enables the mechanical resistance to be generated over a relatively long stroke length, thereby providing smooth and gentle transmission of the mechanical resistance to the front portion of the convertible top.

Additional apparatus suitable for use in closing a convertible top may include means for generating mechanical resistance within a rear portion of the convertible top during a final phase of a convertible top closing operation. For example, if the convertible top has a top dead center point defined between the top fully opened position and the top fully closed position, the mechanical resistance is preferably generated for at least a portion of the distance that the convertible top is moving from the dead center point to the top fully closed position. Such resistance generating means may include a shock absorber, but other well-known devices for generating mechanical resistance are also contemplated depending upon the particular application of the present teachings. Further, means may be provided for transmitting the generated mechanical resistance to the front portion of the convertible top so as to slow downwardly directed movement of the front portion towards the vehicle windshield frame. Such transmission means may include a linkage or hinge pivotably connecting the front and rear portions of the convertible top, although other transmission means may be utilized depending upon the particular application.

In a further preferred aspect of the present teachings, pivotably connected linkages optionally may be disposed within the rear portion of the convertible top and may define an angle between the pivotably connected linkages that increases as the convertible top moves towards the vehicle windshield frame during the final phase of the convertible top closing operation (e.g., at least a portion of the distance from the dead center point to the top fully closed position). In such case, means may be provided for applying the generated mechanical resistance to the opening angle so as to slow down the speed at which the angle opens during the final phase of the convertible top closing operation. One preferred example of such means is an elastic traction cable operably connecting the pivotably connected linkages with the mechanical resistance generating means, in which the elastic traction cable is operably connected therebetween, although other well-known mechanical resistance applying means may be suitably utilized with the present teachings.

In a preferred embodiment, the mechanical resistance generating means only generates mechanical resistance when the convertible top is subjected to traction loading. Optionally, means may be provided for changing the direction of the generated mechanical resistance by at least about 60° between the pivotably connected linkages. More preferably, the direction is changed by at least about 75° and particularly preferred embodiments including changing the direction by about 90°.

Methods are also taught for closing a convertible top and may include generating mechanical resistance within the rear portion of the convertible top during a final phase of a convertible top operation. As noted above, the present teachings may be advantageously applied to the convertible tops that have a top dead center point defined between the top fully opened position and the top fully closed position. In this representative case, the mechanical resistance is preferably generated for at least a portion of the distance that the convertible top is moving from the dead center point to the top fully closed position. However, as also noted above, the present teachings also can be advantageously utilized in embodiments, in which the convertible top does not include a top dead center point. Further, the generated mechanical resistance is preferably transmitted to the front portion of the convertible top so as to slow downwardly directed movement of the front portion towards the vehicle windshield frame.

As noted above, pivotably connected linkages may be disposed within the rear portion of the convertible top and an angle defined between the pivotably connected linkages preferably increases as the convertible top moves from the dead center point to the roof closed position. In such case, the method may further include applying the generated mechanical resistance so as to slow down the speed at which this angle opens.

Each of the additional features and teachings disclosed below may be utilized separately or in conjunction with other features and teachings to provide improved folding roof assemblies and convertible vehicles and methods for designing and using such assemblies and vehicles. Representative examples of the present invention, which examples utilize many of these additional features and teachings both separately and in conjunction, will now be described in further detail with reference to the attached drawings. This detailed description is merely intended to teach a person of skill in the art further details for practicing preferred aspects of the present teachings and is not intended to limit the scope of the invention. Moreover, combinations of features and steps disclosed in the following detail description may not be necessary to practice the invention in the broadest sense, and are instead taught merely to particularly describe representative examples of the invention. Further, various features of the representative examples and the dependent claims may be combined in ways that are not specifically and explicitly enumerated in order to provide additional useful embodiments of the present teachings. All features disclosed in the description and/or the claims are intended to be disclosed separately and independently from each other for the purpose of original written disclosure, as well as for the purpose of restricting the claimed subject matter independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Figure 2:
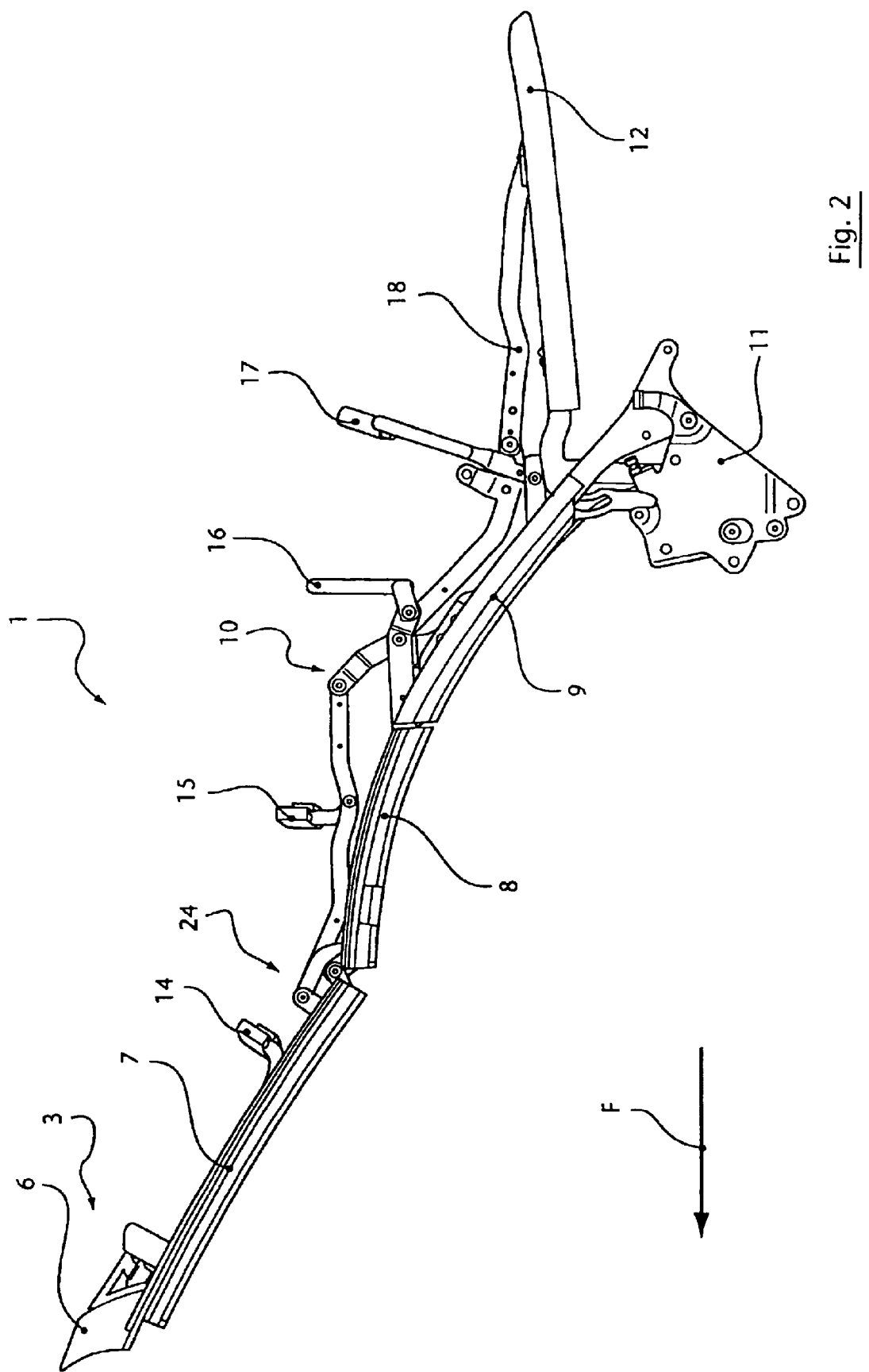
FIG. 2 shows the representative foldable convertible top in an intermediate position, in which the front portion has further moved toward the closing direction of the convertible top, as compared to FIG. 1.
Figure 3:
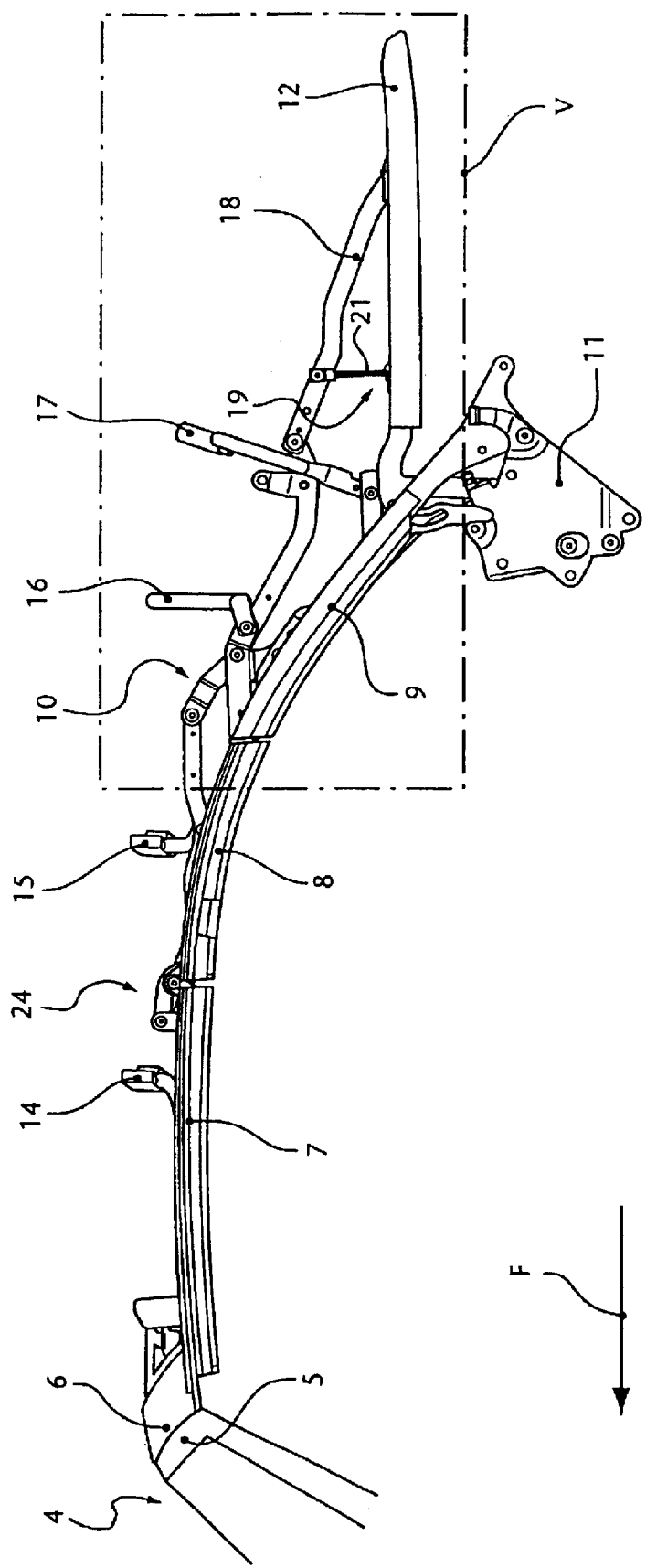
FIG. 3 shows the representative foldable convertible top in a completely closed state, in which a representative traction cable coupled to a representative dampening device is shown in a taut state.

Referring to FIGS. 1–3, representative convertible vehicles (only partially shown for purposes of clarity) may include a foldable convertible top (flexible roof assembly) 1. A substantially rigid front portion 3 is laterally defined along a forwardly disposed portion of the convertible top 1. When the convertible top 1 is disposed in the roof or vehicle closed position (e.g., FIG. 3), the front portion 3 may releaseably engage (e.g., may be releaseably locked to) a vehicle windshield frame 4. A substantially rigid transverse beam 6 optionally may be disposed along the front portion 3 and the transverse beam 6 may be configured so as to conform to a horizontal transverse frame portion 5 of the windshield frame 4. Lateral frame portions 7 preferably extend substantially perpendicularly from the transverse beam 6 in the rearward direction of the convertible top 1.

Optionally, the front portion 3 may be designed and constructed according to a variety of other configurations. For example, the front portion 3 may be formed as an integral die cast member, as a continuous plate body, as a multi-member assembly made of a light-metal or an alloy, etc. If the front portion 3 is not designed as a continuous plate body, the front portion 3 preferably may be covered by a flexible, fabric material in order to impart an attractive appearance. The convertible top 1 optionally may be constructed using a plurality of rigid members or portions (e.g., a hard top) or can be entirely or partially of a flexible nature (e.g., a soft top).

The convertible top 1 may be entirely covered by a flexible fabric material (not shown for the purposes of clarity), which is also known in the art as a "soft shell," a "soft top" or a "canopy." Three lateral (transverse) frame portions 7, 8, 9 may be disposed sequentially in the longitudinal direction and these portions 7, 8, 9 may be movably interconnected via a dead center point linkage 10. The convertible top 1 may be movably or pivotably mounted to the vehicle body (not shown) via a primary mount or bearing 11.

In addition to being affixed to the front portion 3, the fabric covering the convertible top 1 can be tensioned or stretched by the lateral frame portions 7, 8, 9. A tensioning bow (hoop) 12 preferably extends laterally (transversely) along the rear portion of the convertible top 1 between the outer longitudinal sides of the convertible top 1. Further, support bows (hoops) 14, 15, 16, 17 may laterally (transversely) extend between the frame portions 7, 8 and 9. The bows 12, 14–17 also may be utilized to apply tension The dead center point linkage 10 preferably is operably coupled to each of the lateral frame portions 7, 8, 9, as well as the rearwardly disposed tensioning bow 12 in order to transmit movement therebetween. When the convertible top 1 is disposed in (folded into) the top fully open condition (i.e., the vehicle interior is exposed to the outside and the convertible top 1 is stowed), no stress is applied to the dead center point linkage 10. In this representative embodiment, the convertible top 1 has a top dead center point defined between the top fully open position and the top fully closed position. Thus, when the convertible top 1 is closed (unfolded) and stretched, the convertible top 1 will pass through the dead center point. At the dead center point, stress or tension will be applied to the dead center point linkage 10. Then, as the convertible top 1 is further closed (unfolded) to the fully closed position shown in FIG. 3, the stress on the dead center point is again relieved.

As a result, if the downwardly directed component of the movement of the convertible top 1 is not dampened or restrained (slowed down) when the convertible top 1 moves past the dead center point to the top closed position, the front portion 3 (e.g., the transverse beam 6) may strike the windshield frame 5 at a relatively high speed, because the front portion 3 may fall under its own weight towards the windshield frame 5 during the final phase of the roof closing operation. Thus, one aspect of the present teachings is to teach techniques for gently lowering the front portion 3 during the final phase of the roof closing operation by utilizing a dampening device and/or a dampening method.

A rear linkage portion 18 of the dead center point linkage 10 is preferably disposed within the rear portion of the convertible top 1. One portion of the rear linkage portion 18 is pivotably coupled to the tensioning bow 12. Further, the rear linkage portion 18 preferably extends substantially parallel to the longitudinally-extending component(s) of the tensioning bow 12 when the roof is disposed in the top open condition as shown in FIG. 1. Upon further closure of the convertible top 1, the angle defined by the pivotably coupled rear linkage portion 18 and the tensioning bow 12 will increase, as shown in FIGS. 2 and 3.

Figure 4:
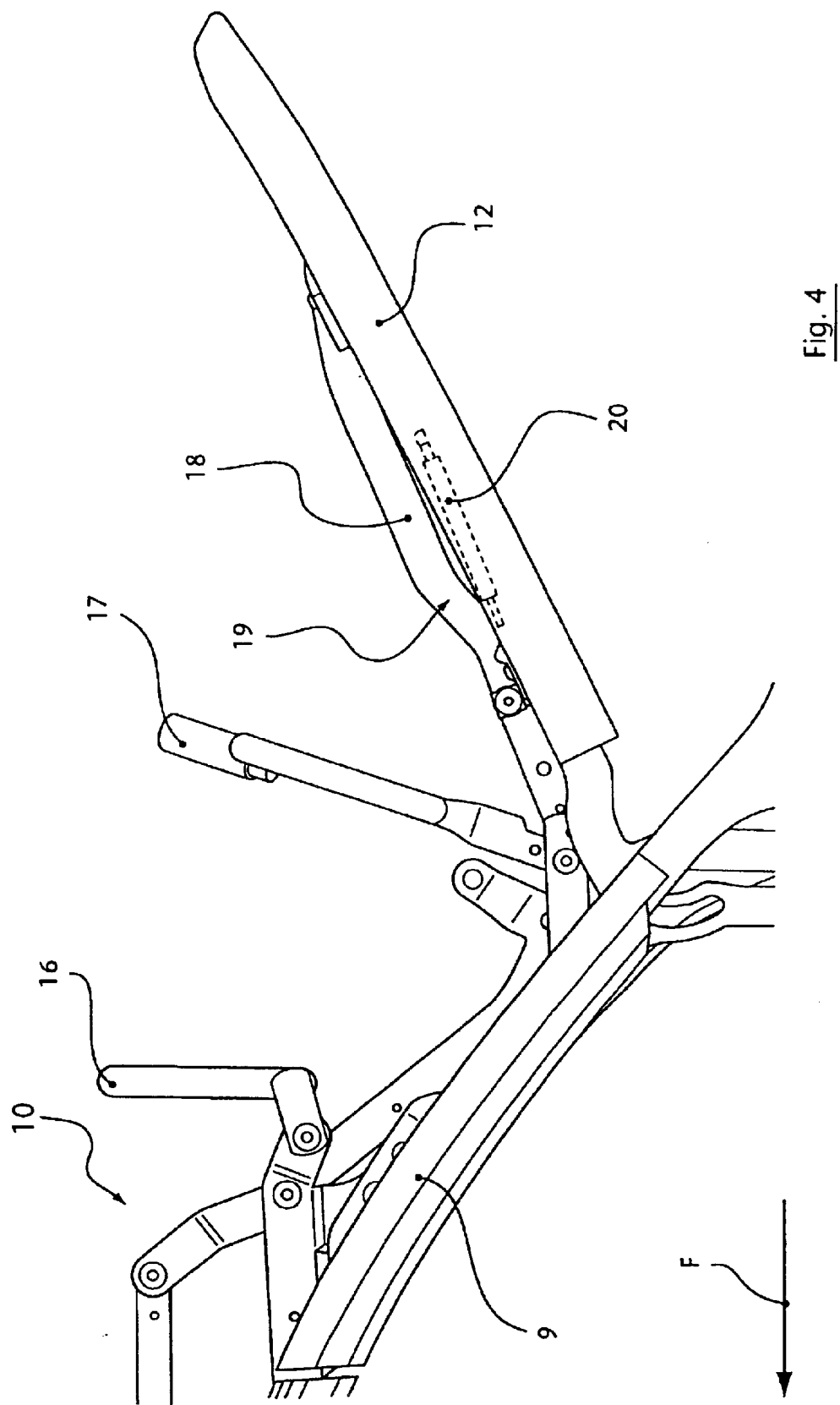
FIG. 4 is an enlarged view of the structures disposed within box IV shown in FIG. 1.
Figure 5:
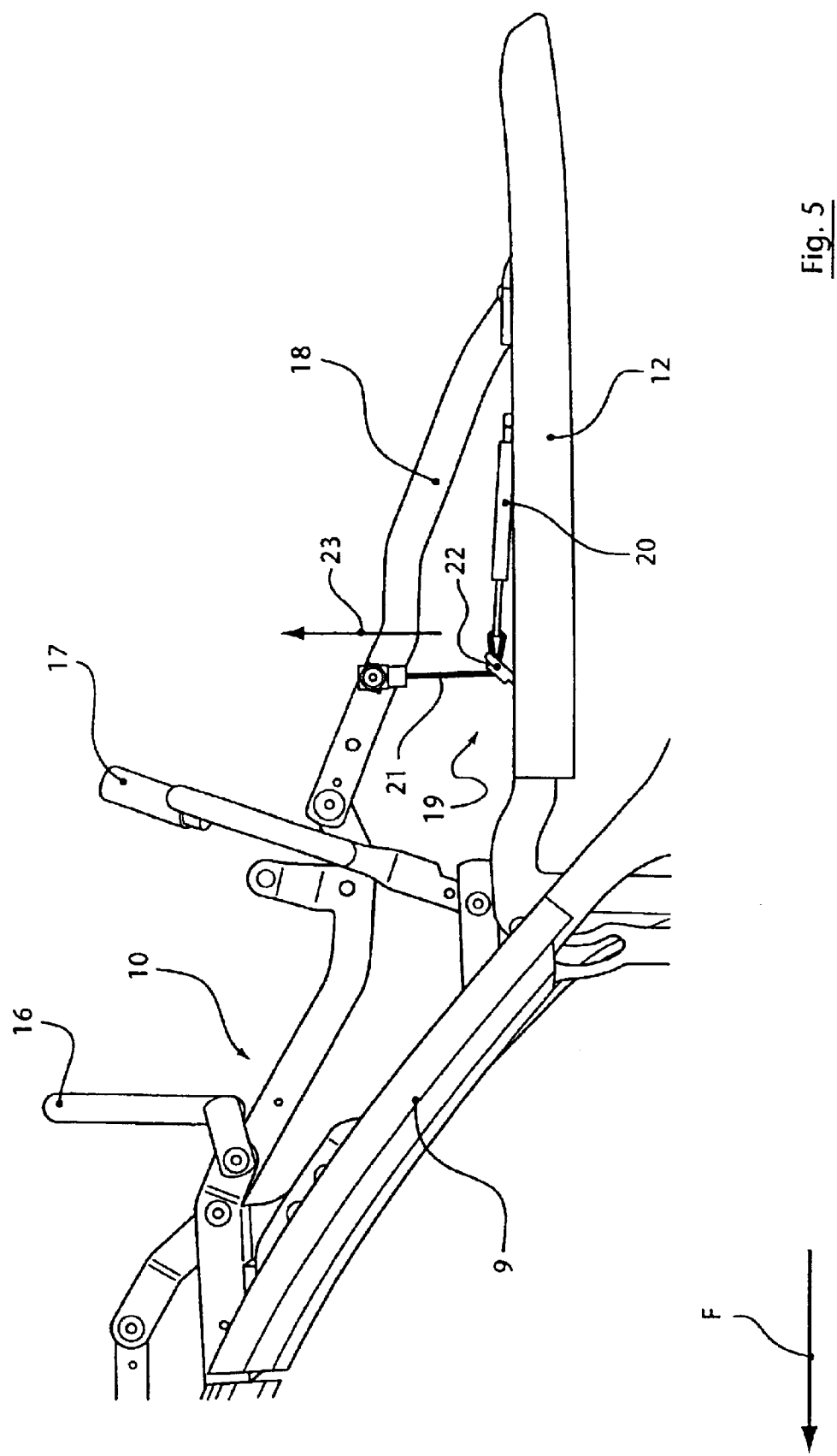
FIG. 5 is an enlarged view of the structures disposed within box V shown in FIG. 3.
Figure 6:
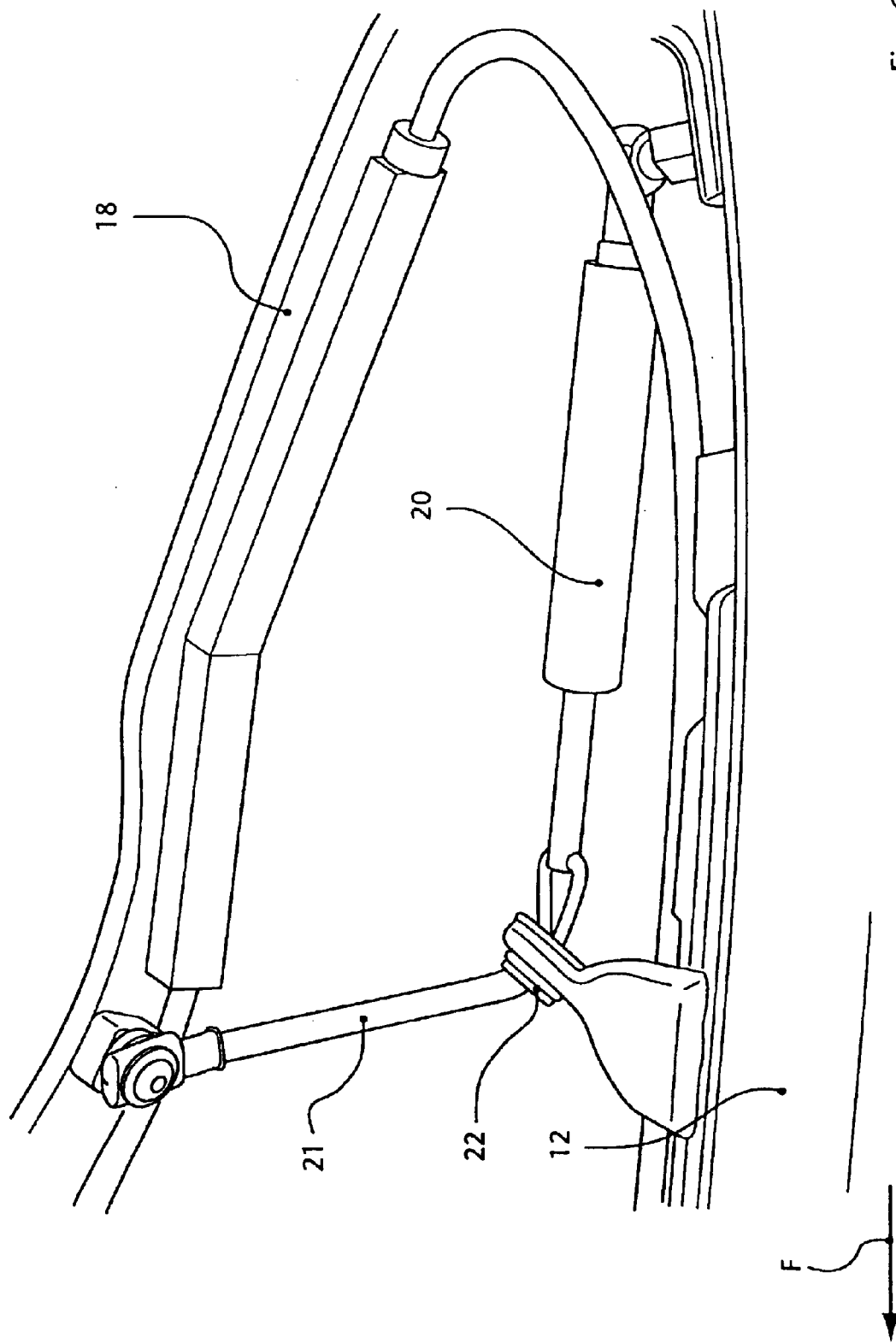
FIG. 6 is an enlarged, perspective view of the representative dampening device, in which an oil-filled shock absorber is affixed to the tensioning bow and a portion of the representative tension cable extends substantially perpendicularly from the tensioning bow via a representative direction-changing loop.

As shown in FIGS. 3–6, a dampening apparatus (shock absorber) 19 is preferably disposed at the rearward portion of the convertible top 1 so as to restrain or slow down the angle opening speed of the pivotably coupled rear linkage portion 18 and the tensioning bow 12 during the final phase of the roof closing operation. In other words, the dampening apparatus 19 is intended to slow down the movement of the rear linkage portion 18 in the direction of arrow 23, as shown in FIG. 5, when the convertible top 1 is being unfolded from the dead center point to the final closed position shown in FIG. 3. As a result, the front portion 3 can be prevented from slamming against the windshield frame 5.

The dampening device 19 preferably includes an oil damper 20 (e.g., an oil-filled shock absorber) and is coupled to the tensioning bow 12. In this preferred arrangement, the damper 20 is parallel, or substantially parallel, with the longitudinal component of the tensioning bow 12, although other arrangements are, of course, possible. A piston is reciprocally movably disposed within the damper 20 and the piston is preferably connected to a traction cable 21, which e.g., may be a resiliently elastic traction cable. Further, a direction-changing loop 22 may be defined on or near the tensioning bow 12. In this case, the traction cable 21 may extend through the direction-changing loop 22 and connect to the rear linkage portion 18 of the dead center point linkage 10, as clearly shown in FIGS. 5–6.

As a result, the distance or space between the rear linkage portion 18 and the longitudinal component of the tensioning bow 12 can be bridged by the dampening device 19. In addition, when the convertible top 1 is closed, the spacing between the rear linkage portion 18 and the tensioning bow 12 will substantially increase, as shown in FIG. 5. Therefore, the piston of the damper 20 may extend or project from the damper 20 so as to avoid over stretching or breaking the traction cable 21, but while providing mechanical resistance to the extension or projection of the piston. Moreover, the generated mechanical resistance is transmitted via the dead center point linkage 10 to the downwardly directed component of the movement of the front portion 3 during the final phase of the top closing operation, thereby slowing the downward descent of the front portion 3.

More specifically, as the convertible top 1 is unfolded towards the roof closed position (i.e., the transition from FIG. 1 to FIG. 3) and moves past the dead center point position, the increasing opening (widening) of the angle between the rear linkage portion 18 and the tensioning bow 12 results in an increase in the distance between the rear linkage portion 18 and the tensioning bow 12, as indicated by the positional changes shown in FIGS. 4 and 5. Therefore, tension will be applied to the traction cable 21 and the oil pressure damper 20 will be activated in order to impart a mechanical resistance to un-restrained extension of the traction cable 21. Consequently, the pace at which the rear linkage portion 18 of the dead center point linkage 10 moves away from the tensioning bow 12 will be reduced, thereby dampening or restraining the pace of the opening movement of tensioning bow 12 with respect to rear linkage portion 18.

The dead center point linkage 10 also may be connected via a hinge 24 to the lateral frame portion 7 of the front portion 3, as shown in FIGS. 1–3. This connection effectively transfers the mechanical resistance generated by the traction cable 21 and the dampening device 19 to the front portion 3 (i.e., via the dead center point linkage 10 and the hinge 24). Thus, the movement of the dead center point linkage 10 and the front portion 3 will be slowed down after the convertible top 1 has passed the dead center point shown in FIG. 2 due to the application of this mechanical resistance. More specifically, an upward and rearward pivoting moment may be applied to the front portion 3 via the hinge 24, which counteracts the force generated by the weight of the front portion 3, thereby preventing the front portion 3 and transverse beam 6 from forcibly striking the windshield frame 4.

In particularly preferred aspects of the present teachings, the damper 20 only dampens traction movement. In other words, as soon as the traction force diminishes, a compression spring (not shown), which may be integrated with the damper 20, is preferably activated, thereby returning the damper 20 to its original position.

The stroke length of the piston can be selected to be relatively large, e.g., about 40 mm or more, in order to provide a favorable spatial arrangement for the dampening device 19. As a result, reliable and gentle dampening of the downwardly directed component of the movement of the front portion 3 is achieved over a relatively large angle of pivotal movement. Thus, the lowering or descending movement the front portion 3 during the final phase of the roof closing operation can be gently brought under control.

Because the present teachings can be practiced utilizing only a few standardised components, foldable roof assemblies according to the present teachings can be manufactured relatively inexpensively. Moreover, a dampening device 19 can be associated with each side of a vehicle.

Naturally, the present teachings are applicable to both manually opening convertible tops and convertible tops that are opened electronically by a motor, a hydraulic cylinder, or any other device that, mechanically or electrically, supplies a force for closing the convertible top 1.

Additional teachings relevant to, and advantageously combinable with the present teachings, are found in commonly-owned U.S. Pat. Nos. 5,253,917, 5,558,389, 5,788,316, 5,816,644, 6,193,301, 6,447,050, 6,454,352, 6,502,891, 6,511,118, 6,536,831, 6,578,898, the contents of which are hereby incorporated by reference as if fully set forth herein.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A convertible vehicle comprising:
   a vehicle body having a vehicle windshield frame, and
   a foldable convertible top having:
      a substantially rigid front portion arranged and constructed to include a downwardly directed component of movement towards a windshield frame of the vehicle during a convertible top closing operation, the front portion being further arranged and constructed to engage the vehicle windshield frame in a convertible top closed position,
      a tensioning bow pivotably coupled to the vehicle body,
      a dead center point linkage pivotably coupled to the vehicle body such that a distance between the tensioning bow and a rear portion of the dead center point linkage increases when the front portion is downwardly moving towards the windshield frame, and
      at least one dampening device fixedly coupled to the pivotable tensioning bow and being operably coupled to the front portion so as to impart mechanical resistance against the downwardly directed component of the movement of the front portion towards the vehicle windshield frame during the convertible top closing operation.

2. A convertible vehicle as in claim 1, wherein the dampening device is arranged and constructed to impart the mechanical resistance only when subjected to traction loading.

3. A convertible vehicle as in claim 2, wherein the dampening device is an oil-filled shock absorber comprising an extendable and retractable piston.

4. A convertible vehicle as in claim 3, further comprising a resiliently elastic traction cable having a first end coupled to the piston and a second end coupled to the rear portion of the dead center point linkage, the traction cable extending via a direction-changing element in a manner that changes the direction of at least a portion of the traction cable and wherein the oil-filled shock absorber is disposed in parallel with a longitudinally-extending, side portion of the tensioning bow.

5. A convertible vehicle as in claim 4, wherein the direction-changing element is arranged and constructed to change the direction of the fraction member by about 90°.

6. A convertible vehicle as in claim 5, wherein the direction-changing element is disposed on the tensioning bow.

7. A convertible vehicle as in claim 1, further comprising a resiliently elastic traction cable having a first end coupled to the at least one dampening device and a second end coupled to the rear portion of the dead center point linkage, the traction cable extending via a direction-changing element in a manner that changes the direction of at least a portion of the traction cable.

8. A convertible vehicle as in claim 7, wherein the direction-changing element is arranged and constructed to change the direction of the traction member by about 90°.

9. A convertible vehicle as in claim 8, wherein the direction-changing element is disposed on the tensioning bow.

10. A convertible vehicle as in claim 9, wherein the convertible top further comprises a plurality of lateral frame portions, and wherein the dead center point linkage is disposed along a longitudinal direction of the lateral frame portions and a front portion of the dead center point linkage is operably coupled to the front portion.

11. A convertible vehicle as in claim 10, wherein the front portion comprises a substantially rigid structural member arranged and constructed to transversely extend between the windshield frame and the dead center point linkage.

12. A convertible vehicle as in claim 11, wherein the at least one dampening device comprises an oil-filled shock absorber having a retractable piston coupled to the traction cable.

13. A convertible vehicle as in claim 12, wherein the piston is arranged and constructed to extend by a piston stroke length of at least 35 mm when the front portion is moving downwardly towards the vehicle windshield frame.

14. A convertible vehicle comprising:
   a vehicle body having a vehicle windshield frame, and
   a foldable convertible top having:
      a substantially rigid front portion arranged and constructed to include a downwardly directed component of movement towards a windshield frame of the vehicle during a convertible top closing operation, the front portion being further arranged and constructed to engage the vehicle windshield frame in a convertible top closed position,
      a tensioning bow pivotably coupled to the vehicle body,
      a dead center point linkage pivotably coupled to the vehicle body such that a distance between the tensioning bow and a rear portion of the dead center point linkage increases when the front portion is downwardly moving towards the windshield frame,
      at least one oil-filled shock absorber fixedly coupled to the pivotable tensioning bow, the shock absorber comprising an extendable and retractable piston and
      a resiliently elastic traction cable having a first end coupled to the piston and a second end coupled to the rear portion of the dead center point linkage, the traction cable extending via a direction-changing element in a manner that changes the direction of at least a portion of the traction cable, the shock absorber and traction cable being arranged and constructed to (i) impart mechanical resistance against the downwardly directed component of the movement of the front portion towards the vehicle windshield frame during the convertible top closing operation only when subjected to traction loading.

15. A convertible vehicle as in claim 14, wherein the oil-filled shock absorber is disposed in parallel with a longitudinally-extending, side portion of the tensioning bow.

16. A convertible vehicle as in claim 14, wherein the direction-changing element is arranged and constructed to change the direction of the traction member by about 90°.

17. A convertible vehicle as in claim 14, wherein the direction-changing element is disposed on the tensioning bow.

18. A convertible vehicle as in claim 14, wherein the convertible top further comprises a plurality of lateral frame portions, and wherein the dead center point linkage is disposed along a longitudinal direction of the lateral frame portions and a front portion of the dead center point linkage is operably coupled to the front portion.

19. A convertible vehicle as in claim 18, wherein the front portion comprises a substantially rigid structural member arranged and constructed to transversely extend between the windshield frame and the dead center point linkage.

20. A convertible vehicle as in claim 14, wherein the piston of the shock absorber is arranged and constructed to extend by a piston stroke length of at least 35 mm when the front portion is moving downwardly towards the vehicle windshield frame.

* * * * *